Figure 1:
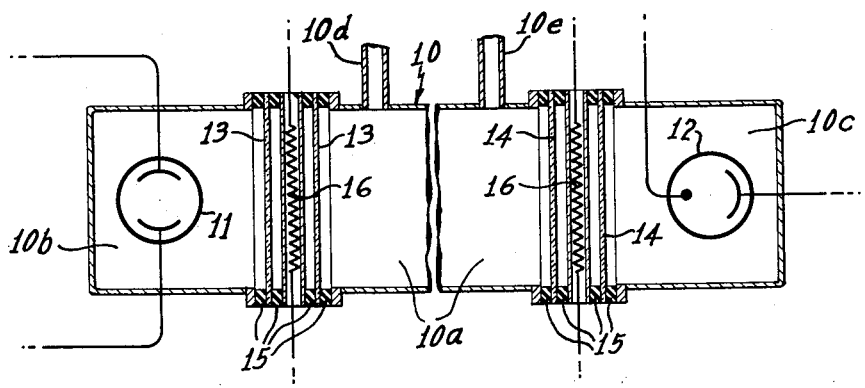

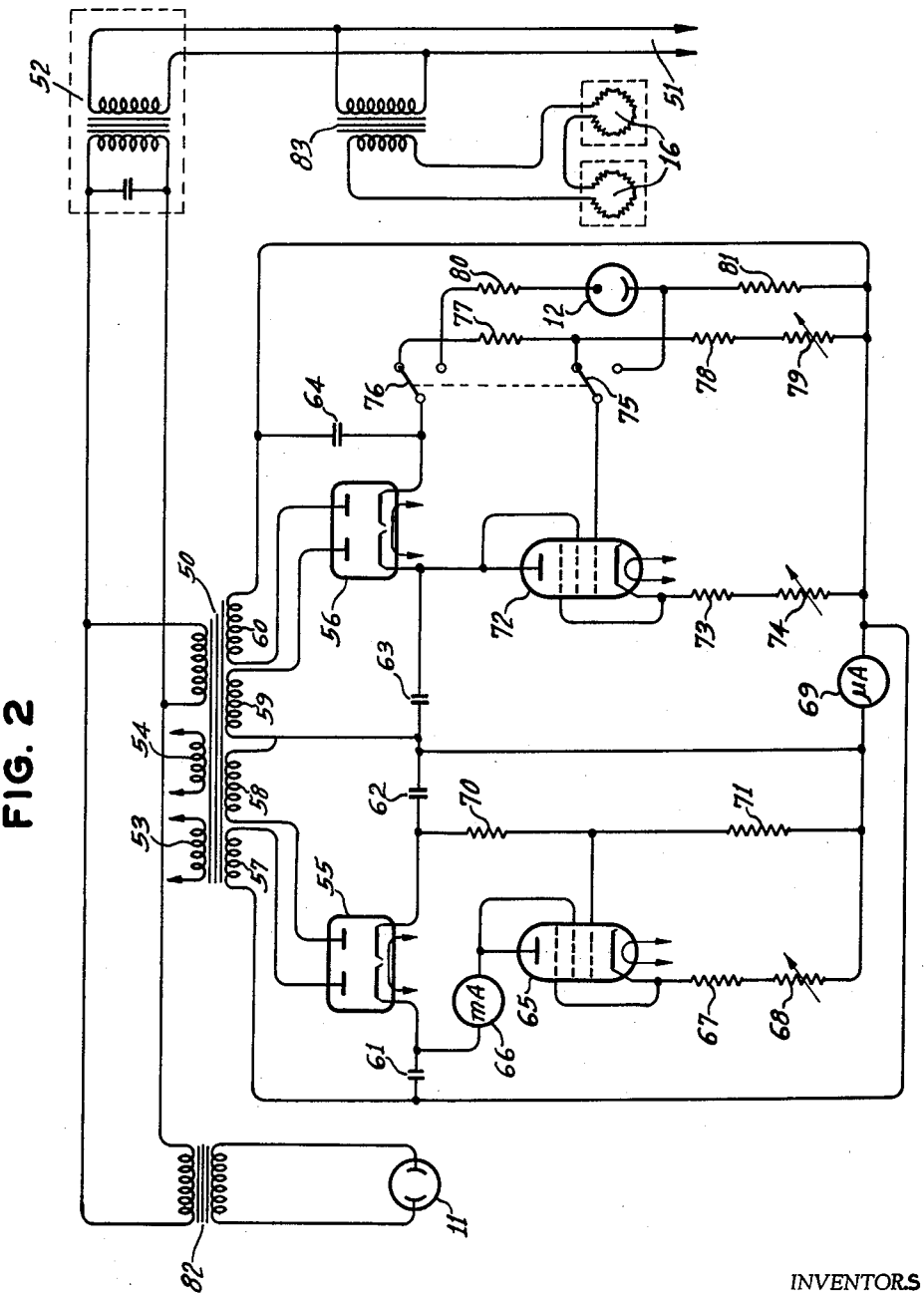

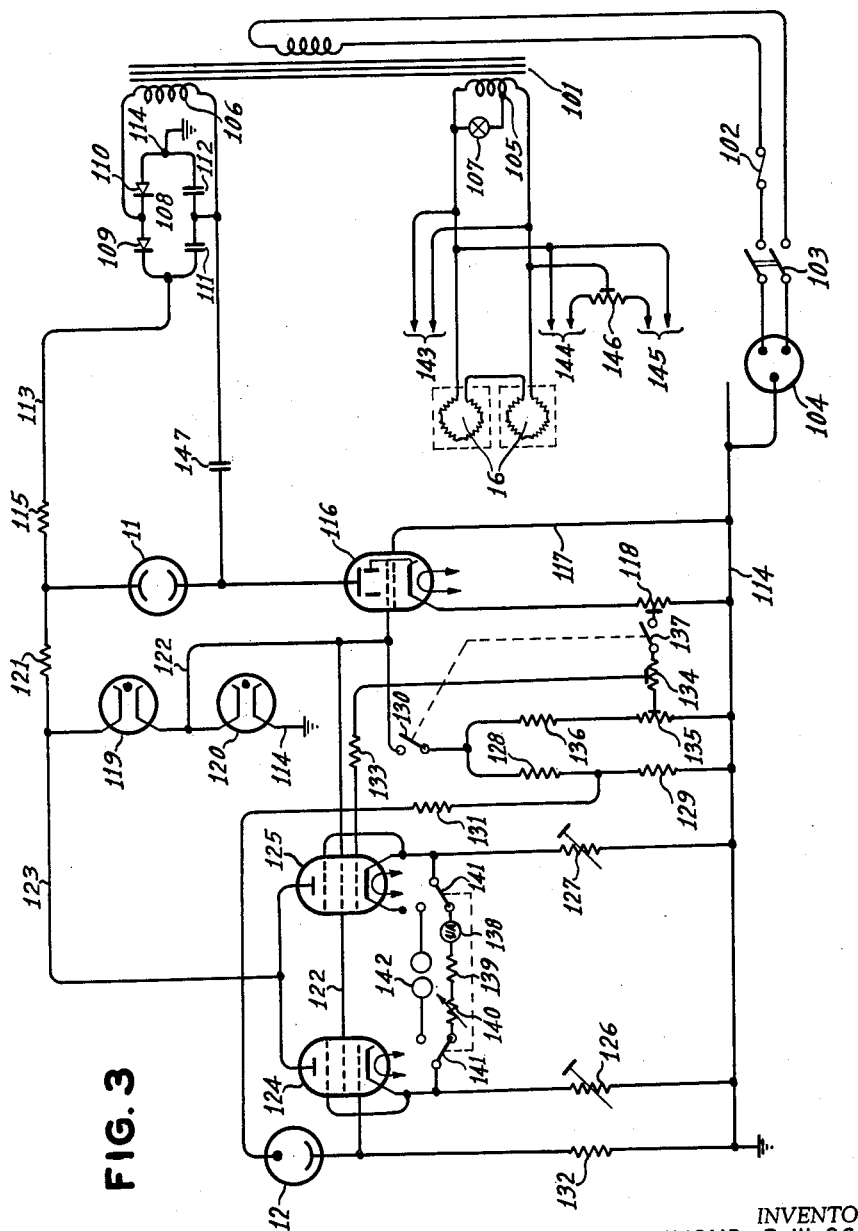

3,067,327
MEASURING DEVICE
Raymond P. W. Scott, Watford, and Frank Carter, Alton, England, assignors to Engelhard Hanovia, Inc., a corporation of New Jersey
Filed June 21, 1957, Ser. No. 667,122
8 Claims. (Cl. 250—43.5)

The present invention relates to improvements in apparatus for determining the concentration of benzole in gas mixtures, such as coal gas and coke oven gas.

The efficiency of a plant for recovering benzole from coal gas is determined by measuring the benzole contents of the gas entering and the gas leaving the plant. The method normally used for this purpose is that of St. Claire Deville (J. usines gaz., 1889, 13, 71), in which the benzole is frozen out of the gas in a suitable trap. This method has the disadvantage that a considerable volume of gas must be passed through the apparatus in order to obtain a convenient volume of condensate; this is especially true when dealing with the gas leaving the recovery plant. It is therefore desirable to have a method that gives instantaneous values for the benzole content of the gas.

A number of methods for instantaneously indicating the benzole content of gas have been examined. The only satisfactory method that has been found involves measuring the absorption of ultra-violet light by the gas. Of the constituents of coal gas, the only ones having any strong absorption bands in the ultra-violet region are the aromatic hydrocarbons that constitute the benzole. Of these, benzene is present in greatest quantity and has a maximum absorption in the vapour state at a wavelength close to 2537 A. The other aromatic hydrocarbons present in appreciable quantities are toluene and the xylenes all of which absorb strongly at this wavelength. It is therefore convenient to use as a light source for measuring these aromatic hydrocarbons, the low-pressure mercury vapour lamp, which emits nearly all of its light energy at a wavelength of 2537 A. The other light emitted by this lamp is in the visible region and if a photo-electric cell that has a low response in the visible region is used as the detector, the light source may be considered to be monochromatic.

An apparatus has been described by Hanson (Ind. Eng. Chem., Anal. Ed., 1941, 13, 119) which operates by transmitting light from a low-pressure mercury-vapour lamp through the gas to be examined onto a photo-electric cell, having relatively high response in the ultra-violet region of the spectrum. The response of the photo-electric cell is fed to an electronic device that registers on the dial of a meter or on the chart of a recorder, the benzole content of the gas.

It has been found in practice however that this apparatus suffers from the disadvantage that, under the influence of the ultra-violet light, gum is deposited on the quartz windows of the apparatus thus preventing the transmission of light.

We have now found that this deposition of gum can be eliminated, or at least reduced, if each quartz window is heated.

According to the present invention therefore an apparatus for determining the benzole content of a gas mixture is provided which comprises a light source emitting substantially all of its light energy at 2537 A., a photo electric cell responsive to light having a wavelength of 2537 A., and a container for the gas mixture, the container having a transparent portion through which the light is passed from the source to the gas mixture and another transparent portion through which the light passes from the gas mixture to the photo-electric cell, and means for heating each of said transparent portions.

Electric signals derived from the photo-electric cell may be passed to an electronic measuring device including for example a bridge circuit. Means for stabilising an electricity supply fed to the measuring device may conveniently be provided for improving the stability of calibration and operation of the measuring device. The electronic measuring device may include a differential amplifier of which one arm is responsive to signals received from the photo-electric cell and the other of which receives a signal indicative of any variation in the operating conditions of the light source.

Each transparent portion preferably comprises a pair of spaced transparent elements, whilst the heating means may take the form of a heated gaseous medium passed through the spaces between the transparent elements, it is preferable for the heating means to comprise a pair of spaced transparent elements. Whilst the heating means may take the form of a heated gaseous medium passed through the spaces between electric resistance heaters disposed one between each pair of elements.

The light source may suitably be, for example, a low pressure mercury vapour discharge lamp requiring a starting voltage of 1600 volts and a working voltage of 300 volts. For many purposes adequate light intensity can be obtained from a 15 watt lamp though an even smaller lamp, for example a 3 watt lamp can be used. By the use of this low wattage, low pressure mercury vapour lamp, ozone formation in the lamp house is reduced and with it the instability of zero reading. The photo-electric cell may suitably be a vacuum photocell with a quartz envelope, the cell being sensitive to radiation of wavelengths between 2000 A. to 4000 A.

The presence of hydrogen sulphide in the gas mixture has an effect on the apparatus reading but under normal circumstances this is negligible. However, with the higher hydrogen sulphide concentrations found in some coal gas, and low benzole concentrations, such as in stripped gas, the effect may be appreciable. It may then be necessary to treat the gas, for example with iron oxide, so as to remove all or part of the hydrogen sulphide from the gas. The presence of 3% by volume of hydrogen sulphide gives a reading equivalent to about 0.15 g. of benzole per 100 l. (about 0.1 gal. per 10,000 cu. ft.).

It is found in practice that when the apparatus is used with a gas mixture substantially free from hydrogen sulphide the deposition of gum can be substantially eliminated or at least reduced if the temperature to which the transparent portion is in the region of 85° C. to 120° C. If however, the gas mixture contains hydrogen sulphide the corresponding temperature would be considerably higher.

It will be appreciated that since the apparatus of the present invention depends for its principle of operation upon the absorption of light, the presence of dust in the gas mixture could give rise to false reading and it will be understood that when the gas mixture contains dust it should be passed through a suitable dust-removing filter such as of glass wool before introduction to the container.

The invention will be more particularly described with reference to the accompanying drawings in which:
FIG. 1 shows diagrammatically a suitable apparatus,
FIG. 2 shows a suitable circuit for use with the apparatus, and
FIG. 3 shows an alternative circuit for use with the apparatus.

Referring now to FIG. 1 the apparatus, denoted generally by 10, comprises a container 10a for a gaseous mixture with a lamp housing 10b at one end and a photo-electric cell housing 10c at the other end, the gas compartment being provided with branch pipes 10d and 10e, one of which serves as the inlet and the other as the outlet for the gas mixture. In the lamp housing 10b there is a mercury vapour discharge lamp 11 which passes light through the gas compartment on to the photo-electric cell 12 in the housing 10c. The gas compartment 10a is separated from the lamp housing 10b by a double quartz window 13 and from the photo-electric cell housing 10c by a double quartz window 14. Disposed between each double quartz window there is an electric resistance heating element 16, the heating element and the quartz windows being separated from each other by silicone rubber rings 15.

By way of example in one form of the apparatus the container 10a is approximately 1½ inches in internal diameter and is approximately 4¼ inches long. The windows are correspondingly approximately 2 inches in diameter and in each pair are spaced from one another by approximately 1 cm. and it is found that satisfactory window heating can be obtained if the two heaters 16 together consume about 9 watts.

If the gas mixture contains dust a suitable dust removing filter, such as of glass wool, is provided upstream at the inlet pipe 10d.

The circuit diagram of FIG. 2 illustrates one manner in which the photo-electric cell may be embodied in an electronic measuring circuit. The primary winding of a transformer 50 is connected to an electricity supply 51 through a so-called constant voltage transformer shown diagrammatically at 52. The transformer 50 has two low voltage secondary windings indicated at 53, 54 for supplying the heaters of two double diodes 55, 56 and also has four higher voltage secondary windings 57, 58, 59, 60. The secondary winding 57 is connected in series with one diode of the valve 55 to a reservoir capacitor 61 to provide a source of potential across the other secondary windings 58, 59 and 60, being singularly connected to capacitors 62, 63, 64, each in series with a diode.

The voltage existing across the capacitor 61 serves as anode supply for a valve 65 which may be a triode or a tetrode or pentode connected as a triode, a milliammeter 66 being connected in series between one side of the capacitor 61 and the anode of valve 65. The cathode of the valve 65 is connected in series with resistor 67, variable resistor 68 and a recorder or indicator 69 to the other side of the capacitor 61. The control grid of the valve 65 is connected to a potential divider formed by resistors 70, 71 connected across the capacitor 62.

The voltage existing across capacitor 63 serves as anode supply for a second valve 72 whose anode is connected directly to one side of the condenser 63 and whose cathode is connected in series with fixed resistor 73 and variable resistor 74 to that side of the recorder or indicator 69 which is connected to the capacitor 61 whilst the side of the capacitor 63 which is not connected to the anode of the valve 72 is connected to the other side of the recorder or indicator 69. The valve 72 may be a triode, or a tetrode, or pentode connected as a triode.

The control grid of the valve 72 is connected to one moving contact 75 of a double pole two-way switch of which the other moving contact 76 is connected to one side of the capacitor 64. With the switch in the position shown in FIG. 2 the control grid is connected to a potential divider which is formed by a fixed resistor 77, and fixed resistor 78 in series with variable resistor 79, connected across the capacitor 64. When the switch is operated, a series circuit formed by fixed resistor 80, the photo-electric cell 12 and fixed resistor 81 is connected in parallel with the capacitor 64 so that the voltage existing across that capacitor provides an anode-to-cathode voltage in the photo-electric cell, and the control grid of the valve 72 is connected to the cathode of the photo-electric cell.

In operation it will be appreciated that valves 65 and 72 are effectively connected in a bridge circuit and that the difference between the anode currents of the valves 65 and 72 will be detected by the recorder or indicator 69.

Initially the value of the variable resistor 79 is adjusted so that the potential divider formed by the resistors 77, 78 and 79 is substantially balanced against that formed by the resistors 70 and 71. With the switch in the position shown, the variable resistor 68 is adjusted until the anode current drawn by the valve 65 is substantially a given value and the variable resistor 74 is then adjusted so that with the same value of anode current drawn by the valve 65 there is no detectable difference between the anode currents of the two valves 65 and 72 as indicated by the recorder or indicator 69. The apparatus is then ready for operation, and upon operating the double pole two-way switch to connect the control grid of the valve 72 to the cathode of the photo-electric cell, a change in the intensity of light falling on the cell 12 will result in a corresponding difference in the anode currents of the valves 65 and 72 and such difference will be detected by the recorder or indicator.

In order to improve the stability of operation it is preferable that the primary winding of the transformer 50 should be supplied through a so-called constant voltage transformer as shown in the circuit diagram of FIG. 2 and it is also desirable that the primary winding of a further transformer 82 having a secondary winding supplying the required conditions for operating the lamp 11 should also be supplied through said so-called constant voltage transformer.

It is in many cases preferable for the heaters 16 to be suitable for operation from a low voltage source and thus the heaters 16 may be connected to a low voltage secondary winding of a still further transformer 83.

By way of example, in a preferred embodiment the double diodes 55 and 56 may be type 6AL5 and the valves 65 and 72 may be type EF86. Each of the secondary windings 57, 58, 59, 60 may be wound for 120 volts, and suitable values of the resistors would be:

| | | | |
|---|---|---|---|
| 67 | 4.7K | 77 | 100K |
| 68 | 5K | 78 | 4.7K |
| 70 | 100K | 79 | 5K |
| 71 | 10K | 80 | 4.7M |
| 73 | 4.7K | 81 | 2.2M |
| 74 | 5K | | |

The capacitors 61, 62, 63, 64 may each have a capacitance of .25μf. The milliammeter 66 may have a full scale deflection of 2 milliamps. and the recorder or indicator 69 a full deflection of 6 microamps.

An alternative form of electronic measuring device will now be described with reference to FIG. 3.

The primary winding of a transformer 101 is connected via a fuse 102 and a double-pole switch 103 to an input socket 104 through which it may be connected to an electricity supply. The transformer 101 has a low voltage secondary winding indicated at 105 and a high voltage secondary winding indicated at 106. The two heaters 16 are connected across the low voltage secondary winding 105 and a pilot light 107 is connected between one end of the secondary winding 105 and a tapping thereon. The higher voltage secondary winding 106 is connected to a voltage-doubler rectifier circuit 108 comprising two metal rectifiers 109, 110 and two capacitors 111, 112, delivering a D.C. supply to supply line 113 and common earth line 114.

The low pressure mercury vapour discharge lamp 11 is connected to line 113 through resistor 115 and to the anode of a beam tetrode 116, of which the control grid and cathode are connected to the earth line 114 by the line 117 and potentiometer 118, respectively. A potential dividing voltage stabilising circuit comprising two gas-filled voltage stabilizers 119, 120 in series with one another is connected between the D.C. supply line 113 and with the earth line 114 through series resistors 121 and 115. As the cathode of the stabilizer 120 is connected to the earth line 114, a first or lower stabilized voltage supply is available on the line 122 between the tubes 120 and 119 and the anode connection of the second tube 119 provides a second or higher stabilised voltage source on line 123. The screen grid of the tetrode 116 is connected to the line 122. To ensure the lamp 11 starting the common connection between one electrode of the lamp and the anode of the beam tetrode 116 is extended through capacitor 147 to one side of the high voltage winding 106.

The two pentodes 124, 125 are connected to form a differential amplifier or bridge circuit. The anodes of both the pentodes are connected to the line 123 to receive a stabilised anode supply and the screen grids are connected to line 122 to receive a lower voltage stabilised supply. The cathodes and suppressor grids of the pentodes are connected to one another and to the common earth line 114 through individual variable resistors 126, 127, respectively. A potential divider consisting of resistors 128, 129 is connected through a switch 130 to the line 122 and provides a supply for the photo-electric cell 12. The mid point of the resistors 128 and 129 is connected via a resistor 131 to the anode on the photo-electric cell 12 whilst the cathode is connected through low resistor 132 to the common earth line 114. The control grid of the pentode 124 is connected to the common connection between the anode of the photo-electric cell 12 and the resistor 132. The control grid of the pentode 125 is extended via a stopper resistor 133 to a potentiometer 134 which provides a balancing voltage. One end of the potentiometer 134 is connected to the slider of a potentiometer 135 which in series with resistor 136, forms a potential dividing network connected through the switch 130 to line 122. The other end of the potentiometer 134 is connected through switch 137 to the slider of the potentiometer 118 between the cathode and the beam tetrode 116 and the earth line 114. The switch 137 is ganged with the switch 130.

The cathode of the pentode 124 is connected to the cathode of the pentode 125 through a recorder or indicator 138 in series with a fixed resistor 139 and a variable resistor 140. A double pole change-over switch 141 may be provided in this circuit to enable an external indicator or recorder to be connected in this circuit by means of terminals 142. The recorder or indicator 138 may conveniently be a microammeter.

The low voltage winding 105 of the transformer 101 is connected directly by leads 143 to the heater of the beam tetrode 116 and to the heaters of the pentodes 124, 125 through leads 144, 145 respectively, including a preset potentiometer 146 to facilitate matching of the two pentodes 124, 125.

In operation the beam tetrode 116 maintains a measure of control of the current flowing through the discharge lamp 11. To achieve this, the screen grid of the beam tetrode 116 is maintained at the stabilised potential of the line 122. If the voltage on the line 113 were to increase the discharge lamp 11 would tend to draw an increased current which would bring about an increased voltage drop across the resistor 118 in its cathode circuit, thereby increasing the bias applied to its control grid. Whilst the control of the current through the discharge 11 is good under these conditions, nevertheless there may still be some variation, since one end of the potentiometer 134 is maintained at a stabilised potential by the potential dividers 135, 136 connected to line 122. A signal representative of any change in the current through the discharge lamp 11 will appear across the potentiometer 134 from which a derived signal can be applied to the control grid of the pentode 125 in such a way that an increase in light output from the discharge lamp 11 results in a proportioned increase and tension applied to the control grid of the pentode 125.

The voltage arising across the load resistor 132 of the photo-electric cell 12 is applied to the control grid of the pentode 124. The potentiometers 118, 134 and 135 are adjusted that with maximum light energy falling on the photo-electric cell 12, the potential applied to the control grid 125 is such that there is no detectable deflection of the meter 138. To obtain such zero setting the potentiometers 118 and 135 are adjusted together so that both ends of the potentiometer 134 are at the same potential. If subsequently the current through the discharge lamp 11 should be increased due to a rise, for example, in the mains supply voltage to which the apparatus is connected, the voltage drop across the potentiometer 118 will increase compared to the voltage drop across the potentiometer 135 and a voltage drop will exist across the potentiometer 134. By adjusting the slider of this potentiometer 134 the appropriate proportion of this voltage drop can be applied as a correcting factor to the control grid of the pentode 125 to restore balance of the bridge.

Any changes in the light intensity falling on the photoelectric cell 12 will result in a change in the signal applied to the control grid of the pentode 124. Such change in signal will result in a change in the total cathode current passing through the valve leading to a rise or fall of cathode potential. Any change in voltage between the cathodes of the pentodes 124, 125 can be detected as an indication on the meter 138.

Amongst other difficulties which are encountered with a simple apparatus are:

(1) Instability of zero reading due to mains fluctuations affected the output of the ultra-violet lamp and the amplifying system.

(2) If a double beam instrument is used, adjustment difficulties arise due to differing response of the two photo-electric cells.

(3) The response of the amplifier varies with the circuit changes during the zero adjustment.

(4) Changes in the current due to changes in the circuit cannot be differentiated from changes in benzole concentration.

These difficulties are avoided by means of the apparatus and circuit just described.

Although the invention has been described with reference to coal gas it is obviously not limited to the determination of benzole in such a gas.

What is claimed is:

1. An apparatus for determining the aromatic hydrocarbon content of a gas mixture, which comprises a gas sample container, means for admitting the gas into said container, a pair of opposed windows in the wall of said container, a source of ultra violet light and a photoelectric cell mounted in line with said windows on opposite sides of said container, and means for applying heat directly to the outer surfaces of said windows to selectively heat the windows to a greater extent than the remainder of the container.

2. An apparatus according to claim 1 in which the means for selectively heating the windows comprises electric resistance elements.

3. An apparatus according to claim 1 in which the light source is a low pressure mercury vapor discharge lamp.

4. An apparatus according to claim 1 in which the light source emits substantially all of its light energy at a wave length of 2537 A.

5. An apparatus for determining the aromatic hydrocarbon content of a gas mixture comprising an ultra violet light source and a photoelectric cell, a gas sample container, a plurality of windows mounted in the walls of said container between the light source and the photoelectric cell, means for admitting the gas mixture into said container, and means for selectively heating the windows to a greater extent of the remainder of the container.

6. An apparatus for determining the concentration of benzene hydrocarbons in a gas mixture, which comprises a gas sample container, a pair of opposed windows in the wall of said container, a source of ultra violet light and a photoelectric cell mounted in line with said windows on opposite sides of said container, means for admitting the gas from a source thereof into said container, the gas being characterized by condensing out gummy deposits when subjected to ultra violet radiations, and means for applying heat directly to the outer surfaces of said windows to selectively heat the windows to a greater extent than the remainder of the container thereby preventing formation of the gummy deposits on said windows.

7. An apparatus for determining the concentration of benzene hydrocarbons in a gas mixture of the group consisting of coal gas and coke oven gas, which comprises a gas sample container, means for admitting the gas into said container, a pair of double windows in opposite sides of said container, an ultra violet light source and a photoelectric cell mounted in line with said windows on opposite sides of said container, means for heating the space between each of said double windows to temperature above 85° C. thereby preventing formation of gummy deposits on the windows, and means for discharging the gas from the container.

8. An apparatus for determining the concentration of benzene hydrocarbons in a gas mixture of the group consisting of coal gas and coke oven gas, which comprises a gas sample container, means for admitting the gas into said container, a pair of opposed windows in the wall of said container, a source of ultra violet light and a photoelectric cell mounted in line with said windows on opposite sides of said container, means for applying heat directly to the outer surfaces of said windows to selectively raise the temperature of said windows above 85° C. thereby preventing formation of the gummy deposit on the windows, and means for discharging the gas from the container.

References Cited in the file of this patent

UNITED STATES PATENTS

| | | |
|---|---|---|
| 1,791,254 | Von Brockdorff | Feb. 3, 1931 |
| 1,923,461 | Small | Aug. 22, 1933 |
| 2,342,513 | Gaty | Feb. 22, 1944 |
| 2,442,913 | Abrams | June 8, 1948 |
| 2,452,122 | Gumaer | Oct. 26, 1948 |
| 2,673,298 | Hutchins | Mar. 23, 1954 |
| 2,802,109 | Waters | Aug. 6, 1957 |
| 2,831,118 | Sparks | Apr. 15, 1958 |
| 2,855,522 | Robinson et al | Oct. 7, 1958 |

OTHER REFERENCES

Nev: Construction of a Dual Beam Heated Infrared Cell, Journal of the Optical Society of America, vol. 43, No. 6, pages 520, 521, June 1953.